United States Patent [19]

Hardiman et al.

[11] Patent Number: 6,043,318

[45] Date of Patent: *Mar. 28, 2000

[54] NITRILE RUBBER/POLYVINYL CHLORIDE BLENDS

[76] Inventors: Christopher John Hardiman, 20 Garden St., Farmington, Conn. 06032; George Thomas McKenzie, 291 E. Queens Dr., Williamsburg, Va. 23185; Lothar Frank Stiberth, 16 Stonybrook Rd., Naugatuck, Conn. 06770

[ * ] Notice: This patent issued on a continued prosecution application filed under 37 CFR 1.53(d), and is subject to the twenty year patent term provisions of 35 U.S.C. 154(a)(2).

[21] Appl. No.: 08/721,429

[22] Filed: Sep. 27, 1996

[51] Int. Cl.[7] ................ C08L 9/02; C08L 27/06
[52] U.S. Cl. ............ 525/197; 525/192; 525/195; 525/233; 525/234; 525/235; 525/238; 525/239; 524/525; 524/527; 524/565; 524/567
[58] Field of Search .................... 525/192, 195, 525/197, 238, 239, 233, 234, 235; 524/525, 527, 565, 567

[56] References Cited

U.S. PATENT DOCUMENTS

| | | |
|---|---|---|
| 3,505,274 | 4/1970 | Kolberg . |
| 4,008,193 | 2/1977 | Scheidl et al. . |
| 4,614,756 | 9/1986 | Veldiserri ................ 524/147 |
| 5,021,491 | 6/1991 | Abeler ..................... 524/180 |
| 5,194,498 | 3/1993 | Stevenson et al. .......... 525/81 |

FOREIGN PATENT DOCUMENTS 877225  9/1961  United Kingdom .

OTHER PUBLICATIONS

R.D. DeMarco et al. "Processing of Powdered PVC–NBR Polyblend Compounds" Rubber Chemistry and Technology, vol. 45. No. 4, Jun. 1972. at pp. 1111–1124, XP002048453 see p. 1119, last paragraph see p. 1114.

"Standard Test Methods for Rubber—Evaluation of NBR (Acrylonitrile–Butadiene Rubber)[1]", *American Society for Testing Materials*, pp. 473–476.

"Heat Stabalizers", *Encyclopedia of Chemical Technology*, Jacqueline I. Kroschwitz; Mary Howe–Grant—4th ed., vol. 12, pp. 1071–1091.

*Primary Examiner*—Mark L. Warzel
*Attorney, Agent, or Firm*—Raymond D. Thompson

[57] ABSTRACT

Disclosed is a process for the making a polyvinylchloride/ acrylonitrile-butadiene rubber blend by a) coating a polyvinylchloride resin with a stabilizer to form a precoated PVC; b) blending said precoated PVC with one or more acrylonitrile-butadiene rubbers to form a prestabilized NBR/PVC blend; and c) applying heat and pressure to intimately blend said prestabilized NBR/PVC blend into a fluxed NBR/PVC blend. Another aspect is a novel polyvinylchloride/acrylonitrile-butadiene rubber blend having a stabilizer homogeneously and uniformly distributed throughout the microscopic polyvinylchloride domains.

10 Claims, No Drawings

NITRILE RUBBER/POLYVINYL CHLORIDE BLENDS

FIELD OF THE INVENTION

This invention relates to stabilized polyvinyl chloride (PVC)/nitrile rubber compositions. More particularly, it relates to fluxed blends of PVC and nitrile rubber which exhibit greatly enhanced thermal stability. This increased stability results from the process of coating the PVC with stabilizer prior to fluxing. The resulting fluxed blend demonstrates much improved color stability or inhibition of color development coupled with increased mill time.

BACKGROUND OF THE INVENTION

Blends of about 70% nitrile rubber (NBR) and 30% polyvinyl chloride (PVC) are known to have excellent ozone and oil resistance. Various of these types of blends possess superior processing. A typical commercially available product that is such a combination is a nitrile rubber/PVC blend. Parts fabricated from such blends have a smooth finish and high gloss. Abrasion and oil resistance make them excellent polymer materials for shoe soles, hose, and for jacketing for wire and cable. These materials are also widely used in closed cell sponge applications.

Thermal stability of these blends is critically important to their performance when formulated into finished products. In addition, enhanced thermal stability will reduce the amount of off-grade material manufactured thereby reducing the production costs and increasing the product manufacturing efficiency.

It is understood by most practitioners in the art of compounding such materials that stabilizer systems for them should combine high temperature stability, good initial color and long term stability characteristics, and relative ease and economics of use. PVC resins have been stabilized with such materials as tin salts and zinc salts and combinations thereof. See, for example, U.S. Pat. No. 4,614,756 to Veldiserri. Combinations of aluminum salts and calcium salts have also been used as stabilizer combinations as has been disclosed by Scheidl et al in U.S. Pat. No. 4,008,193.

The stabilizers for a mixture of PVC and a nitrile rubber may comprise standard antioxidants and stabilizers including various amine and phenol antioxidants and other stabilizing materials. Typical of such stabilizer systems include sodium oleate, calcium stearate, zinc stearate, dioctyl phthalate, butylated hydroxy toluene (BHT), epoxidized soybean oil (ESO), and various barium-zinc salts.

Regardless of which stabilizer or stabilizer system is used, it is the current practice to add the stabilizer material(s), the NBR, and the PVC together. Among the problems that arise from this process include poor color stability and a need to maximize mixing time for better blending for blends of PVC and NBR.

These materials are mixed and fluxed in typical rubber machinery used for this purpose, such as a Banbury or Brabender Mixer. The instant invention, which differs from the usual practice by the prestabilization of the PVC, results in greatly increased mill time and reduced color. The ingredients comprising this blend are the same as those in current use; the marked and surprising difference in properties are the result of the process of prestabilization of the PVC.

The above remarks indicate the need in the art for new and improved stabilizer systems for polyvinyl chloride/nitrile rubber compositions. The improved stabilizer systems would impart the desired combinations of properties, including increased stability, as demonstrated by color stability and increased mixing time. An additional benefit of the stabilizer system of this invention would be increased efficiency in terms of time and expense of production of the PVC/NBR blend.

It is therefore an object of this invention to describe a process by which the PVC particulate and nitrile rubber is compounded with stabilizer and/or antioxidant in a high shear dry blending process. The shear should be sufficient to raise the temperature of the PVC particulate/stabilizer mixture to at least about 60° C but no higher than 80° C. The use of this pre-stabilized PVC particulate in the standard process yields a fluxed blend with significantly enhanced thermal stability leading to increased mixing (mill) time and better color stability.

It is an additional object of this invention to provide a high quality blended product with increased thermal stability that has a better (lower) color level than do blends not prestabilized according to the instant invention. It is a still further object of this invention to produce a blended material with increased mill or mixing time. It is an additional object of the invention to significantly reduce the amount of off-grade material produced under typical factory conditions without any extraordinary or costly quality control means.

SUMMARY OF THE INVENTION

The present invention is directed to a process for making fluxed blends of nitrile rubber and prestabilized polyvinyl chloride. The resulting blends exhibit enhanced thermal stability and increased time prior to degradation during mixing and fabrication by the end user of these blends. In addition, when produced in full-scale plant quantities, the process efficiency is enhanced through a reduction in the amount of material degraded during production.

The invention as disclosed herein comprises a process for the making a polyvinylchloride/acrylonitrile-butadiene rubber blend comprising the steps: a) coating a polyvinylchloride resin with a stabilizer to form a precoated PVC; b) blending said precoated PVC with one or more acrylonitrile-butadiene rubbers to form a prestabilized NBR/PVC blend; and c) applying heat and pressure to intimately blend said prestabilized NBR/PVC blend into a fluxed NBR/PVC blend. Another embodiment of the invention is a novel polyvinylchloride/acrylonitrile-butadiene rubber blend having microscopic polyvinylchloride domains and acrylonitrile-butadiene rubber domains, the improvement comprising having a stabilizer homogeneously and uniformly distributed throughout said polyvinylchloride domains.

The invention yields marked and surprising improvements in color and mill stability properties of the blended product compared to similar products made without the prestabilization of the PVC. The use of this pre-stabilized PVC particulate in an otherwise conventional fluxed PVC/NBR manufacturing process yields a fluxed blend with significantly enhanced thermal stability leading to increased mixing (mill) time and better color stability.

DETAILED DESCRIPTION OF THE INVENTION

Prestabilization of the PVC

In this process, the PVC particulate is first coated with the stabilizer package such that the PVC particulate is substantially covered by the stabilizer prior to or simultaneously with the initiation of dry compounding with the stabilizer in a high shear dry blending process. The blending process should include either independent heating means or shear should be sufficient to raise the temperature of the PVC particulate/stabilizer mixture to at least about 60° C. but no higher than 80° C. The types of PVC useful in this invention are any resin having softening properties suitable for blending with NBR. Suspension polymerization resins are the preferred resins in fine powder form.

Blending or fluxing of PVC/NBR

The NBR rubber is mixed with prestabilized PVC typically in a mixer such as a Brabender or Banbury to a minimum temperature of 350° F. up to a maximum temperature of 450° F., preferably 375 to 400° F. Alternatively, extruders of single or twin screw types may also be used to advantage to intimately blend and flux the PVC/NBR materials. The amount of time involved is dependent upon the type of NBR rubber utilized and the efficiency of the mixing apparatus utilized. In an efficient high shear mixer, this mixing takes no less than 2 minutes and no more than the limit of thermal stability of the material.

A typical mixing process may be the following. The Brabender mixer is preheated to 175° C. prior to the NBR/PVC fluxing operation. A mixture of NBR rubber and prestabilized PVC in the ratio of about 70 parts NBR and about 30 parts prestabilized PVC is introduced into the Brabender mixer at a preset operating speed of 50 rpm. When the NBR/PVC mixture is completely loaded, the mixing speed is increased to 80 rpm and held at 80 rpm until a temperature of 188° C. is reached. At 188° C., the mixing speed is reduced to 50 rpm.

The temperature of the NBR/PVC blend is held at 188° C. for 60 seconds and then the entire batch of NBR/PVC blend is quickly discharged and passed through a cool mill, where the nip is set at hand tightness. The NBR/PVC blend is subjected to four passes through the hand tight mill where the stock is cut and folded after each mill pass. The mill nip is then reduced to 0.075" and the NBR/PVC blend is subjected to three final passes. Following the last pass, the milled sheet is sprayed with cold water and then air dried prior to packaging.

Stabilizers for PVC

During processing, halogen-containing polymers are usually heated to elevated temperatures in grinding, mixing, and shaping operations that they routinely undergo. Polymers and copolymers of vinyl chloride (PVC) and vinylidene chloride are especially sensitive to heat. At elevated temperatures they become brittle, are color-changed, or are otherwise damaged so they are no longer suitable for their desired end use. For these reasons, heat stabilizers are usually added to such halogen-containing plastic materials to prevent the polymers from decomposing during normal processing.

The term "stabilizer" as used herein shall mean one or more organic or inorganic compounds useful for protection of PVC against thermal, uv, and/or mechanical degradation. Many types of such stabilizers are known and conventionally used in the PVC industry. The Kirk-Othmer Encyclopedia of Chemical Technology, "Heat Stabilizers", vol 12, pages 1071–91(John Wiley, NY 1994), herein incorporated by reference, provides an illustrative but non-exhaustive list of such stabilizers which have been used for these purposes in the past. It is contemplated that new compounds may be developed which can be advantageously used in this invention and shall be deemed to be included as stabilizers. The term "stabilizer package" is a term commonly used in this industry to connote a plurality of stabilizer compounds used together and shall be considered equivalent to the defined term "stabilizer". Stabilizers include organotin compounds such as alkyltins, dialkyltins, aryltins, poly(dialkyltin maleate), dialkyltin bis(alkyl maleate), dialkyltin bis(2-alkylthioglycolate), where alkyl is preferably $C_4$–$C_8$. Some preferred stabilizers contain calcium, zinc, magnesium, lead, barium and cadmium salts or soaps, especially combinations of Ca—Zn, Ba—Ca—Zn, Ba—Zn, and most preferred Ba—Cd. Other common ones comprise mixtures of alkaline earth metal salts and polyhydric alcohols. Combinations of aluminum salts and calcium salts have also been used as stabilizer combinations.

The levels of usage of the stabilizer vary by the chemical identity the active ingredient and by the number of stabilizers present in the package. Based on one hundred parts by weight PVC/NBR, each stabilizer may be present in parts by weight levels of about 0.01 to about 6.0, preferably about 0.1 to about 3.0, more preferably 0.2 to 2.0.

Costabilizers

The term "costabilizer" shall mean other recognized stabilizer materials which may enhance the effect of the stabilizer system for the PVC and/or act as an antioxidant or stabilizer for the NBR rubber as well. Typical components of such costabilizer systems include epoxy compounds, antioxidants (ie phenolics or amines), polyols, phosphites, β-diketones, substituted amines, and hydrotalalcite. The NBR rubbers typically utilize stabilizer systems including antioxidants of many classes (phenolic, amines and phosphites) and sodium oleate, calcium stearate, zinc stearate, dioctyl phthalate, butylated hydroxy toluene (BHT), epoxidized soybean oil (ESO), and various barium-zinc salts. Based on one hundred parts by weight PVC/NBR, each co-stabilizer may be present in levels of about 0.01 to about 15.0, preferably about 0.5 to about 8.0, more preferably 1.0 to 4.0.

Acrylonitrile-Butadiene Rubbers (NBR)

The term "NBR" shall mean any of the class of Acrylonitrile-Butadiene Rubbers classified as such by the International Institute of Synthetic Rubber Producers (IISRP). These are well known elastomers having acrylonitrile to butadiene amounts by weight of 25–50% acrylonitrile, preferably 28–39% and most preferably 30–35%. The ratio of PVC/NBR may be any practical ratio, but current commercial products vary from 20/80 to 50/50 or even to 60/40 if ozone resistance is critical A general procedure used in the factory for producing nitrile rubber (NBR) follows. The acrylonitrile-butadiene is reacted in an emulsion polymerization process as is conventional. NBR finishing is done in a continuous flow process. This process consists of coagulating the submicroscopic rubber particles in latex to form a crumb, separating the crumb from its clear, aqueous medium, and then washing, drying, and packaging it. Coagulation is also referred to as flocculation, and the crumb is sometimes called floc. The clear, aqueous medium resulting from coagulation may be called serum.

In normal plant production, before flocculation, latex entering the finishing area from the production area is stored in large blend tanks. Blends of numerous reactor batches are prepared in these tanks to ensure product uniformity. In these blend tanks antioxidant may be added to some NBR latex types.

Flocculation is induced by adding various chemicals to the latex to convert the emulsifiers to non-emulsifying substances. The production of NBR/PVC blends is preceded by isolation of the NBR via the floc, followed by dewatering, and then drying of the NBR. The chemicals that are added to induce floc are usually brine and sulfuric acid. Usually the brine is added first to condition the latex for the proper type of flocculation by acid.

Following the flocculation of the material, a vibrating conveyor screener between the floc tank and the reslurry tank drains the serum from the floc before the floc is washed by reslurrying in fresh water. As the floc flows from the reslurry tank, it passes over a second vibrating screener which drains away the reslurry water to the sewer.

Proper operation of the floc line depends upon achieving a clear serum and the proper floc size. If the serum is milky, this is an indication that rubber solids are being lost. If the floc size is too large, the floc cannot be washed well enough and the latex will be trapped. If the floc size is too small, an excessive amount of fines will be lost and the dewatering device will not feed readily. Achievement of proper operation of the floc line depends upon adjustment of flow rates, pH, floc tank temperature, and floc tank agitation. These conditions may vary for individual blends and can be adjusted by operators skilled in the art.

Usually, increasing brine flow will correct milky serum and decrease particle size. Increasing the acid (or lowering pH) will usually correct the milky serum and increase particle size. Increasing water flow will usually decrease particle size. If the floc contains large amounts of fines, raising the floc tank temperature to around 100° F. will cause the fines to agglomerate. When the correct particle size is achieved, the temperature can be lowered to about 70–80° F.

The wet floc then passes through a mechanical device where water is squeezed or screwed out. Water is squeezed out such that the rubber blend product has a moisture content of from about 8% to about 16%. This process may be called dewatering. After dewatering, the product is conveyed to a device for drying by evaporation the remaining moisture to a level of 1% or less. The drying device may be a tunnel dryer which subjects a slowly moving bed of rubber to circulating hot air at about 250° F. for about 45 minutes. The nitrile rubber could also be utilized in this invention in the latex phase.

Of particular interest in this invention is a nitrile polymer blend comprised of acrylonitrile-butadiene copolymer blended with polyvinyl chloride. For the purposes of this invention, experimental PVC/NBR blend products were based on a PVC prestabilized with a modified stabilizer package that demonstrated a reduced tendency to cause mold fouling as well as an improved resistance to thermal discoloration. Mold fouling is the unwanted deposition of residues on the hot surfaces of the mold being used to form the part.

Besides producing a PVC/NBR composition with improved properties, an additional object of this invention is to provide cost benefits and improved production efficiency. There is no additional raw material cost associated with the production of the improved material of this invention. For a given stabilizer loading, an increase in mill time safety from about 6 to about 14 minutes, or about a 230% increase, is realized by incorporating that stabilizer into the PVC prior to blending/fluxing with the NBR. Laboratory work has also demonstrated that prestabilization allows about a 25 to 33% net reduction of stabilizer without loss of efficacy.

EXAMPLES

Preparation of the prestabilized PVC

The powdered PVC suspension-type resin was placed in a high intensity Henschel dry powder mixer along with the stabilizer package. In the case of Examples 1 and Comparative Examples A and B, the stabilizer package was the ESO, Calcium stearate and Zinc Stearate components shown in Table A. Example 2 stabilizer package was the two Barium-Zinc salts, ESO and the optional phenolic antioxidant. The PVC and stabilizer were mixed with sufficient shear to raise the temperature of the coated PVC to at least about 60° C. but no higher than 80° C., thereby forming the prestabilized PVC for subsequent use in fluxing with the NBR rubber.

The NBR rubber was then blended in a 30/70 weight ratio with the prestabilized PVC and intimately blended and fluxed in an extruder at temperatures ranging from 350 to 415° F. to yield fully fluxed blends showing good surface gloss and good physical properties.

Table B shows the physical properties and vulcanizate properties (as run in a recipe according to ASTM D-3187) of Ex.1 versus Comparative Ex A and Ex.2 versus Comparative Ex. B. Aged tensile strength is improved for the examples of the invention while the rest of the properties were found to be similar, a very desirable result for fabricators who need not change their factory conditions to benefit from the improvements to color and processing safety time.

In Table C a color stability test is run on an open heated mill for 14 minutes with color observations made at two minute intervals. The lower the color value, the lighter color the material is. As heat history is accumulated, the components break down chemically and produce dark color byproducts yielding undesirable high color values. As can be seen from the mill time vs discoloration table (Table C), the additional processing time is substantial and allows additional high temperature processing time on the open mill without experiencing discoloration. This additional time is valuable to the end user of this product to maximize the efficiency of plant finishing operations with minimal waste material.

TABLE A

| | Ingredients of NBR/PVC Blend, parts by weight | | | |
|---|---|---|---|---|
| Property | 1 | A | B | 2 |
| PVC-prestabilized | 30 | — | — | 30** |
| PVC-conventional | — | 30 | 30** | — |
| NBR (29% ACN/71% Bd) | 67 | 67 | 67 | 69 |
| Epoxidized Soybean Oil(ESO 100% active) | 2.8 | 2.8 | 2.8 | 0.5 |
| Calcium Stearate (100% active) | 0.08 | 0.08 | 0.08 | — |
| Zinc Stearate (100% active) | 0.18 | 0.18 | 0.18 | — |
| Barium-Zinc salt[1] | — | — | — | 0.25 |
| Phenolic Antioxidant[3] | — | — | — | 0.25 |
| Barium-Zinc salt[2] | — | — | — | 0.10 |

[1]Therm Chek 144,
[2]Therm Chek 191 both trademarks of and sold by Ferro Corp, and
[3]Naugard 431 (alkyl substituted phenol antioxidant) trademark of and available from Uniroyal Chemical Company, Inc.
**PVC for B and Ex 2 have higher molecular weight and IV than Ex A and 1.

TABLE B

| | Examples | | | |
|---|---|---|---|---|
| Property | 1 | A | B | 2 |
| PVC-prestabilized | 30 | — | — | 30 |
| PVC-conventional | — | 30 | 30 | — |
| Relaxation, % | 82 | 82 | 83 | 84 |
| Mooney Viscosity, ML 1 + 4 @ 100° C. | 100 | 108 | 101 | 94 |
| Rheometer, ODR Ts$_2$ | 7.8 | 8 | 8.2 | 7.7 |
| Rheometer, ODR Tc$_{90}$ | 17 | 20.8 | 20.7 | 19.1 |

TABLE B-continued

| | Examples | | | |
|---|---|---|---|---|
| Property | 1 | A | B | 2 |
| Vulcanizate Properties | | | | |
| Tensile Strength, MPa (Min) | 23 | 20.3 | 23.2 | 25.9 |
| Elongation, % (Min) | 470 | 440 | 480 | 470 |
| 100% Modulus, MPa | 9.4 | 9.3 | 10.2 | 9.7 |
| 200% Modulus, MPa | 15 | 14.4 | 16.3 | 16.0 |
| Hardness, Shore A | 93 | 93 | 95 | 91 |
| Tear Strength, Die C | 486 | 496 | 501 | 503 |
| Aged Tensile, % Change 70 hrs @ 100° C. in oil | +12 | +28 | +13 | +5 |

Comparative Example C is an NBR/PVC blend sold as Nipol DN 508 (Trademark of Nippon Zeon). Comparative Example D is an NBR/PVC blend made and sold as Perbunan VC 3470 (a trademark of Bayer Corporation).

From Table C, it can be seen that the Examples of this invention possess both a color index and mill time that is satisfactory throughout the fourteen minute time period of the test. Similarly, it can be seen that PVC/NBR blend Comparative A fails after 8 minutes, DN 508 fails after 6 minutes, and VC 3470 fails after 6 minutes. These evaluations were accomplished using recipes and procedures in accord with ASTM D-3187.

TABLE C

COLOR vs TIME ON MILL

| Sample # | Color Index ASTM D-3187 | | | | | | | |
|---|---|---|---|---|---|---|---|---|
| Mill Time, min → | 0 | 2 | 4 | 6 | 8 | 10 | 12 | 14 |
| Ex 1 | 42 | 48 | 75 | 83 | 108 | 108 | 108 | 108 |
| Ex 2 | 42 | 84 | 84 | 95 | 122 | 136 | 139 | 149 |
| Comparative Examples | | | | | | | | |
| A | 53 | 63 | 84 | 116 | 176 | 210 | 231 | 252 |
| B | 80 | 109 | 155 | 216 | 231 | 255 | 269 | — |
| C | 92 | 151 | 177 | 303 | 500 | 500 | 500 | 500 |
| D | 74 | 74 | 90 | 231 | 302 | 500 | 500 | 500 |

We claim:

1. A process for the making a polyvinylchloride/acrylonitrile-butadiene rubber vulcanizable blend comprising the steps:

a) preheating a polyvinylchloride (PVC) resin in the presence of an effective amount of a stabilizer at elevated temperature of at least about 60° C. and simultaneously coating said polyvinylchloride (PVC) resin with said stabilizer at elevated temperature of at least 60° C. to form a precoated PVC;

b) blending said precoated PVC with one or more acrylonitrile-butadiene rubbers (NBR) to form a pre-stabilized NBR/PVC blend comprising a ratio of polyvinylchloride/acrylonitrile-butadiene rubber from about 10% to about 60% polyvinylchloride and about 90% to about 40% acrylonitrile-butadiene rubber; and c) applying heat sufficient to achieve a fluxing temperature between about 350° F. to about 450° F. and pressure during mixing to intimately blend said prestabilized NBR/PVC blend into a fluxed NBR/PVC blend having microscopic domains of polyvinylchloride and domains of acrylonitrile-butadiene rubber homogeneously and uniformly distributed throughout said polyvinylchloride domains.

2. The process according to claim 1 wherein said stabilizer is selected from the group consisting of organotin compounds, metal salts, metal soaps, and polyhydric alcohols exhibiting heat and color stabilizing effect when mixed with polyvinylchloride.

3. The process according to claim 1 wherein said applying heat and pressure step includes high shear mixing to form said fluxed NBR/PVC blend.

4. The process according to claim 1 wherein said coating step further comprises adding said stabilizer to said polyvinylchloride resin in a substantially dry blend to form a coated PVC and high shear dry blending the coated PVC with sufficient heat and shear to raise the temperature of the coated PVC to at least about 60° C. but no higher than 80° C., to form said precoated PVC.

5. The process according to claim 1 wherein said fluxed NBR/PVC blend comprises from about 20% to about 60% polyvinylchloride and about 80% to about 40% acrylonitrile-butadiene rubber.

6. The process according to claim 1 wherein said acrylonitrile-butadiene rubber contains a costabilizer selected from one or more of the group consisting of sodium oleate, calcium stearate, zinc stearate, dioctyl phthalate, butylated hydroxy toluene, epoxidized soybean oil, barium salts and zinc salts.

7. The process according to in claim 6 wherein said costabilizer is present at of about 0.01 to about 15.0 parts by weight per hundred parts by weight of polyvinylchloride and acrylonitrile-butadiene rubber.

8. The process according to in claim 1 wherein said stabilizer is selected from the group consisting of alkyltin compounds, alkali metal salts, alkaline earth metal salts, alkali metal soaps, alkaline earth metal soaps, and polyhydric alcohols.

9. The process according to claim 1 wherein said stabilizer comprises one or more stabilizers, each being present in parts by weight per hundred parts by weight of polyvinylchloride and acrylonitrile-butadiene rubber of about 0.01 to about 6.0.

10. The process according to claim 1 wherein said stabilizer further comprises at least one costabilizer selected from the group consisting of phenolic antioxidants, amine antioxidants, phosphite antioxidants, sodium oleate, calcium stearate, zinc stearate, dioctyl phthalate, butylated hydroxy toluene, epoxidized soybean oil, barium salts and zinc salts.

* * * * *